United States Patent [19]
Knittel et al.

[11] Patent Number: 6,016,846
[45] Date of Patent: Jan. 25, 2000

[54] PIPE INSULATION SLEEVE

[75] Inventors: Gerald H. Knittel, Brecksville; Kasper J. Niemira, North Royalton; Judith A. Roth, Akron, all of Ohio

[73] Assignee: Morgan Adhesives Company, Stow, Ohio

[21] Appl. No.: 08/597,842

[22] Filed: Feb. 7, 1996

[51] Int. Cl.⁷ ................................................... F16L 11/04
[52] U.S. Cl. .................... 138/128; 138/149; 138/151; 138/158; 138/169
[58] Field of Search ..................... 138/128, 149, 138/151, 158, 165, 167, 169, 170, 171

[56] References Cited

U.S. PATENT DOCUMENTS

| | | | |
|---|---|---|---|
| 1,691,783 | 11/1928 | Mottweiler et al. | 138/149 |
| 2,175,283 | 10/1939 | Cote | 138/128 |
| 2,788,304 | 4/1957 | Scovronek | 138/151 |
| 3,203,653 | 8/1965 | Hall | 138/156 |
| 3,557,840 | 1/1971 | Maybee | 138/149 |
| 4,576,206 | 3/1986 | Lauren . | |
| 4,614,016 | 9/1986 | Laing et al. . | |
| 4,713,271 | 12/1987 | Searl et al. . | |
| 4,748,060 | 5/1988 | Fry et al. . | |
| 4,857,371 | 8/1989 | McClintock | 138/156 |
| 4,996,088 | 2/1991 | Kuittel et al. | 138/149 |
| 5,123,453 | 6/1992 | Robbins . | |
| 5,310,594 | 5/1994 | Holland et al. | 138/128 |
| 5,405,665 | 4/1995 | Shukushima et al. . | |
| 5,417,901 | 5/1995 | Hartman et al. . | |
| 5,419,859 | 5/1995 | Hartman et al. . | |
| 5,558,159 | 9/1996 | Kato | 138/171 |

FOREIGN PATENT DOCUMENTS

| | | | |
|---|---|---|---|
| 0632423 | 12/1951 | Canada | 138/156 |
| 9216001 | 1/1993 | Germany . | |
| 195 23 396 A1 | 6/1995 | Germany . | |
| 29517380 | 1/1996 | Germany . | |
| WO 95/15461 | 6/1995 | WIPO . | |

*Primary Examiner*—Denise L. Ferensic
*Assistant Examiner*—James F. Hook
*Attorney, Agent, or Firm*—Oldham & Oldham Co., LPA

[57] ABSTRACT

Pipe insulation sleeve and adhesive construction therefor, having a reduced amount of stress applied to the adhesive. A flexible foamed elastomeric tubular pipe insulation sleeve has a longitudinally extending slit which enables the sleeve or jacket to be placed around a pipe or portion thereof. An adhesive is applied to opposite walls of the slit, forming an adhesive joint, in order to hold the construction together after the insulation sleeve has been placed around a section of pipe. Stress on the adhesive joint is minimized or reduced in either of two ways. First, the tubular sleeve is formed with a V-shaped slit in which the opposite faces or walls of the slits intersect at an acute angle. In a preferred embodiment, the V is inverted (i.e., the open end of the V faces inwardly) and formed essentially along the minor axis of the elliptical shape which the sleeve assumes over time. In a completed construction in which the tubular sleeve encircles a portion of pipe, the walls of the slit are in facing engagement with each other, and held in engagement by adhesive. In a second construction for reducing stress, adhesive is applied both to the opposite walls of the silt as well as to longitudinally extending portions of the inner surface of the sleeve which are immediately adjacent to the slit, so that the sleeve can be adhered to itself along the slit and to the pipe which it encircles. These two constructions can be combined.

24 Claims, 4 Drawing Sheets

PIPE INSULATION SLEEVE

TECHNICAL FIELD

This invention relates to both pipe insulation sleeves and to constructions which include such a pipe insulation sleeve. More specifically, this invention relates to improved physical and adhesive constructions for closing the slit in foam insulation tubing, such as vinyl nitrile foam insulation.

BACKGROUND OF THE INVENTION

Pipes which are used in dwellings, and commercial buildings or in industrial plants and which carry steam for steam heat, hot water, cold water, chemicals, or petroleum products and the like are generally provided with an exterior layer of insulation. Such pipes may be formed of copper, steel, aluminum, plastic, rubber, or other like materials. This exterior layer of insulation frequently comprises jackets or sleeves which are wrapped around the pipe. These jackets or sleeves are generally applied in segments which abut one another. Each segment comprises a generally cylindrically shaped block of insulation having a centrally disposed, anally aligned channel adapted to receive the pipe. The material forming the insulation sleeve may be a flexible elastomeric material. Each segment is slit along its axial length so that the pipe may pass through the split and reside within the central channel. The type of insulation material that has proven to be the best in conjunction with air conditioning or refrigeration units is a vinyl nitrile foam which is extruded into a tubular shape with the internal diameter being about the external diameter of the pipe to be insulated, such vinyl nitrile foam being quite flexible, and easily contourable to various radii and/or paths of the pipe to be insulated. Other foam insulation materials are also known. Normally the vinyl nitrile or other type of foam insulation tubing will come in lengths of approximately 6–8 feet with internal diameters ranging from 1 to 8 inches and external diameters of 2 to 10 inches, whereby the thickness of the wall is about ½ to 2 inches. The 6–8 foot lengths are convenient to be handled by a workman installing this insulation material after a refrigeration or air conditioning unit has been put into place. Typically, the vinyl nitrile tubular foam has a single slit longitudinally of the length so that the slit can be pulled back manually by the installer to slip the tubular insulation over the pipe. After an insulation sleeve has been placed around a pipe, the portions of the pipe on opposite sides of the slit are brought together and sealed. Sealing has been accomplished generally by applying an adhesive, typically a pressure-sensitive adhesive, to one or both of the opposed faces of the slit, which are brought together in sealing engagement, or alternatively, by providing on the outer surface of the insulation sleeve on one side of the slit a longitudinally extending flap which comprise a pressure-sensitive adhesive on a backing, the pressure-sensitive adhesive is pressed into engagement with the outer surface of the insulation sleeve on the opposite side of the slit.

Adhesive joints of the type described above have frequently proved to be short lived. This is due in part to the stresses within the insulation jacket or sleeve, which tend to pull the portions of the sleeve on opposite sides of the slit apart and to create a great deal of stress on the adhesive joint. Also while there have been many systems for closing the slit in such foam pipe insulations, including putting pressure-sensitive adhesive on to opposite sides of the slit, and then bringing those adhesives together, there has always been a significant problem in getting good pressure-sensitive adhesive anchorage, especially to a vinyl nitrile foam insulation material, as well as other types of foam insulation materials, and still achieving a good pressure-sensitive adhesive bonding relationship between the outwardly exposed adhesive to the adhesive on the opposite side of the slit.

Shrinkage in elastomeric foam insulation sleeves has been reported to be in the order of 2%. Shrinkage has been recognized as a problem which leads to stress along the longitudinal slit. Stresses are also formed during the extrusion process. Still other sources of stress occur during storage and shipment of finished sleeves. Insulation sleeves as extruded are cylindrical with a circular cross section. In storage, due to the weight of a sleeve itself and to sleeves stacked above it, the shape becomes distorted so that it takes on an oval or elliptical form. Also, sleeves are frequently compressed into an elliptical shape to reduce the sleeve's internal void space. As a consequence, it is necessary to use a sleeve whose nominal inside diameter (which assumes that the sleeve is still circular in shape) is slightly to somewhat larger than the outside diameter of the pipe to be encased. As a result upon installation, stress is placed on the sleeve on either side of the slit tending to pull apart an adhesive joint. This tendency to pull the adhesive joint apart is observed, whether adhesive is applied to the opposite faces of the slit or by means of a longitudinally extending pressure-sensitive tape applied to the outside surface on either side of the slit As used herein, the term "pressure-sensitive adhesive" means the adhesive is tacky at ambient temperature whereas a "hot melt adhesive" is dependent upon temperature elevation, wherein the adhesive becomes tacky only upon temperature elevation. While the preferred embodiment of this invention appears more applicable to a pressure-sensitive adhesive, it could also be applicable to a hot melt adhesive.

SUMMARY OF THE INVENTION

It has been found that stress in foamed elastomeric pipe insulation jackets can be alleviated and that adhesive joints having long life are provided by means of modified constructions according to this invention.

It is a further object of the invention to provide a low price but effective sealing system for vinyl nitrile foam or other foam pipe insulation, and particularly to hold the longitudinal slit in the foam insulation together tightly around the pipe on which it is attached without any delamination occurring at or in the slit.

According to a first aspect of this invention, this is accomplished by providing a flexible tubular pipe insulation sleeve of foamed elastomeric material having permanent set and memory, said sleeve as formed having a body which is bounded by a cylindrical inner surface adapted to surround a pipe and a cylindrical outer surface which is concentric with said inner surface, said sleeve as formed further including a longitudinal slit extending essentially radially from said inner surface to said outer surface, at least a portion of said slit being of V configuration and comprising a pair of intersecting opposite walls which intersect one of the cylindrical surfaces along respective spaced parallel and longitudinally extending first and second intersection lines and which intersect each other at an acute angle along an longitudinally extending apex line which is spaced from and parallel to the intersection lines and within the body of the sleeve.

This invention according to a second aspect provides an adhesive construction comprising a flexible tubular pipe insulation sleeve of foamed elastomeric material having permanent set and memory, said sleeve as formed having a body which is bounded by a cylindrical inner surface adapted to surround a pipe and a cylindrical outer surface which is concentric with the inner surface, the sleeve as formed further including a longitudinal slit extending essentially radially from the inner surface to the outer surface and having opposite first and second walls; and a pressure-sensitive adhesive comprising a first portion applied to a substantial area of at least one of the walls of the slit, and a second portion of adhesive being in the form of longitudinally extending regions of adhesive which are adhered to portions of the inner surface of the sleeve and which are adjacent to and on one or both opposing sides of the slit, the first portion of adhesive being adapted to adhere opposite walls of the slit together and the second portion of adhesive being adapted the adhere the inner surface of the insulation sleeve to a pipe.

DETAILED DESCRIPTION OF THE PREFERRED EMBODIMENTS

Figure 1:
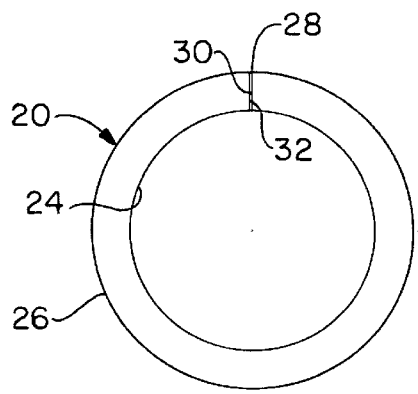
FIG. 1 is an end view of a flexible tubular foam elastomer insulation sleeve according to the prior art, as formed and before slitting.

This invention will now be described with reference to preferred embodiments thereof.

All structures described herein, e.g., flexible foam elastomeric sleeves and pipe constructions, have the same cross-sectional shape over their entire length and are, therefore, fully shown and described with reference to end views. Longitudinally extending lines in these structures are shown as points in the end views herein.

First, a foamed elastomeric insulation sleeve 20, as known in the prior art, will be described with reference to FIGS. 1–3.

Sleeve 20 as formed has a longitudinally extending cylindrical inside surface 24 of circular cross section, a longitudinally extending cylindrical outside surface 26 which is concentric with the inside surface 24, and a vertical slit 28 which extends longitudinally along the entire length of sleeve 20 and radially the entire width of sleeve 20, i.e., from the inside surface 24 to the outside surface 26. Sleeve 20 at the slit has two abutting wall surfaces 30 and 32, which are faces or walls of slit 28 and are on opposite sides of the slit.

Sleeve 20 is flexible and elastomeric, so that the slit 28 may be opened up to place the sleeve around a portion of a round pipe 22 (FIG. 3) and may thereafter be closed, e.g., by means of an adhesive joint Sleeve 20 may be formed by extrusion. Sleeves according to this invention, as well as prior art sleeve 20 (which is described for comparison purposes) may be made of a vinyl nitrile foam which is the preferred foam insulation utilized particularly for air conditioning and refrigeration lines to maintain high and/or low temperatures in the piping systems associated with such overall configurations. Typically the vinyl nitrile foam insulation will be extruded in a tubular configuration and longitudinally slit to allow it to slip over the pipe, and the purpose of this invention is to provide an effective closure system for the longitudinal slit in such vinyl nitrile foam pipe insulation.

More generally, elastomeric sleeves throughout this specification, including sleeves according to this invention and prior art comparison sleeve 20 may be formed of any conventional foamed insulation sleeve material. Such materials include, for example, nitrile polymers such as, ABS (acrylonitrile-butadiene-styrene), thermoplastic elastomers (which are usually block copolymers of polystyrene and an elastomer such as polyisoprene, polybutadiene, ethylene-propylene, rubber or ethylene-butylene rubber), polyethylene, polypropylene, ethylene-propylene (EP) rubber, polystyrene, polyvinyl chloride (PVC), polyether, polyurethane or polyester.

A characteristic of flexible, foamed elastomeric materials is that they have both permanent set and memory. Consequently, they may be deformed by stress, especially by stress applied over a long period of time, and will assume a new deformed shape due to permanent set. As a result of memory, if a stress is applied and then removed, the object will return to its new deformed shape and not to its original shape.

Figure 2:
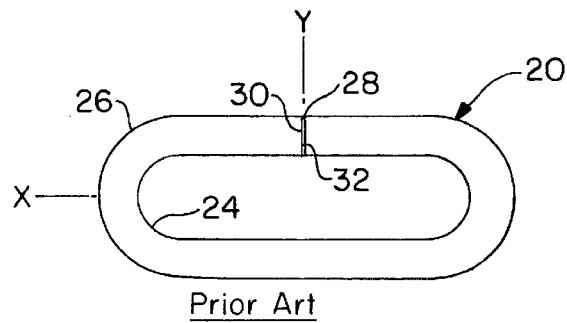
FIG. 2 is an end view of a flexible tubular foamed elastomeric insulation sleeve of FIG. 1 after it has been slit vertically and has been in storage for a time, showing that the sleeve, originally circular in shape, has taken on an oval or elliptical shape.

It is commonplace for sleeve 20 over time to assume an oval or elliptical shape having a horizontal major axis X and a vertical minor axis Y, as shown in FIG. 2, especially in larger diameter sleeves (most commonly those with an I.D. greater than 2 inches and a wall thickness greater than ½ inch). Furthermore it is common practice to ship and store sleeves 20 in a stack one above the other, so that further compression into an oval or elliptical shape takes place due to the weight of a sleeve itself and the weight of the sleeves above it. During packaging, the internal void is intentionally reduced to increase the number of sleeves per shipping container. The resultant deformation (a consequence of permanent set) gives rise to an oval or elliptical shape as shown in FIG. 2.

Vertical-slit 28 is formed at the highest level of sleeve 20 or less preferably within 30–45° on either side of this point. FIG. 2 shows sleeve 20 after slitting and assuming an elliptical shape. According to current practice, this slit extends radially from inside diameter or surface 24 to outside diameter or surface 26 of sleeve 20 and extends longitudinally the entire length of the sleeve. The sleeve after slitting has two parallel opposite walls or faces 30 and 32, which are also opposite walls or faces of the silt Slit 28 may be cut by known means, such as a hot wire; a stationary, reciprocating or rotating knife; a laser, a water jet; or other means known in the art. This slit maybe formed either at the factory or at the job site. However, as a result of the present invention it is intended that a complete pipe insulation construction can be manufactured at the factory and shipped in a ready-to-use state to the job site. These cutting techniques are the same in all embodiment herein.

Figure 3:
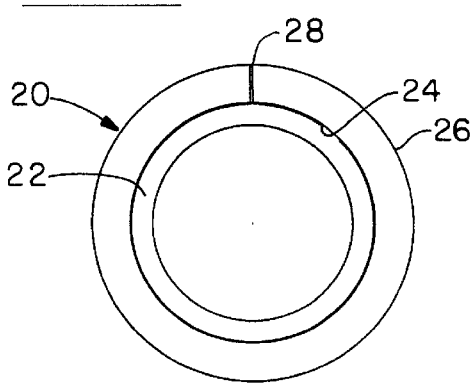
FIG. 3 is an end view of an insulated pipe construction comprising a pipe and, as an insulation jacket, a tubular foamed insulation sleeve as shown in FIG. 2.

FIG. 3 represents an idealized prior art pipe construction comprising a pipe 22 surrounded by a sleeve 20, in which the insulation sleeve 20 is assumed to possess a round or circular shape. The inside diameter of sleeve 20 is assumed to be only slightly larger than the outside diameter of the pipe 22 which it encases. Generally the nominal inside diameter of the sleeve 20 (which assumes that the sleeve retains its original circular shape) must be slightly to somewhat larger than the outside diameter of the pipe 22, because of deformation of the sleeve to elliptical shape as shown in FIG. 2.

When a sleeve 20 according to the prior art and as shown in FIGS. 1 and 2 is placed around a pipe at a job site and a radially formed slit 28 is sealed by conventional means, e.g., by pressure-sensitive adhesive applied to the opposite walls 30 and 32 of the slit 28, or by an adhesive tape applied to the outer surface 26 of the sleeve so that it bridges the slit 28, the resulting adhesive joint is highly stressed and such products have a relatively high failure rate especially around bends in pipes such as 22. When the sleeve 20 is slit vertically at its highest portion as shown in FIG. 2, whether at the factory or at the job site, the adhesive joint is most highly stressed at or near outer surface 26. If the adhesive joint fails, the walls 30, 32 of slit 28 will "open up," or spread apart particularly toward the upper end of the slit 28 at or near outer surface 26.

While, undoubtedly, such deformation of the insulation sleeve into an oval or elliptical shape has been well recognized in the art, what has not been recognized, or at least addressed, prior to the present invention is the stress which such deformation places on adhesive joints that are used to close an insulation sleeve slit after the sleeve has been place around a length of pipe.

Figure 4:
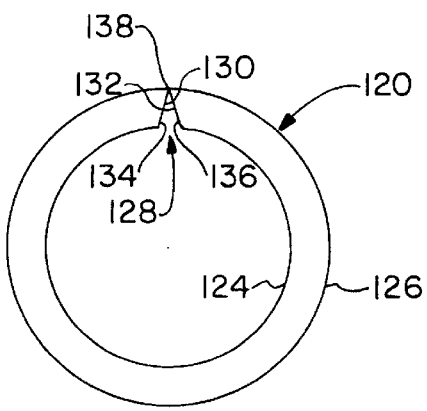
FIG. 4 is an end view according to a first aspect and specifically a first embodiment of a flexible tubular foamed elastomeric insulation sleeve of the invention as formed.

FIG. 4 illustrates a foamed elastomeric flexible insulation sleeve 120 according to a first embodiment (and first aspect) of the present invention. As with prior art sleeve 20, sleeve 120 is a tubular body, which, as formed, has a longitudinally extending cylindrical inside surface 124 of circular cross section, a longitudinally extending cylindrical outside surface 126 which is concentric with the inside surface 124. Similarly, all sleeves to be subsequently described in greater detail, i.e., sleeves 220 (FIG. 8), 320 (ig. 9), 420 (FIG. 10), 520 (FIGS. 11 and 12), 620 (FIG. 13), and 720 (FIG. 16) have, as formed, a cylindrical inner surface (224, 324, 424, 524, 624, and 724, respectively) of circular cross section, and a cylindrical outer surface (226, 326, 426, 526, 626, and 726, respectively), which is also of circular cross section and is concentric with the inner surface. Sleeve 120 further has a longitudinally extending inverted V-shaped slit 128 which extends longitudinally the entire length of sleeve 120 and radially the entire width of sleeve 120, i.e., from the inside surface 124 to the outside surface 126. Sleeve 120 at the slit has two longitudinally extending wall surfaces 130 and 132, which are faces or walls of slit 128 and are on opposite sides of the slit 128. These form an inverted V as seen in end view (FIG. 4). The opposite faces or walls 130 and 132, both of which are planar, intersect the inside surface 124 of sleeve 120 along respective lines of intersection 134 and 136, which are spaced apart and parallel. Both of these lines of intersection extend longitudinally the entire length of sleeve 120.

Walls 130 and 132 intersect at an acute angle θ along a longitudinally extending line of intersection 138. Line of intersection 138 is within the body of sleeve 120 (that is, it is a real and not a virtual line of intersection), and in the preferred embodiment shown is at the outer surface 126 of the sleeve 120. This angle θ can range from about 5° to about 60°, with a more preferable range being about 7–30°. Currently, the most preferred angle for the insulation sleeves having a 4 inch diameter is about 10–15°.

Figure 4A:
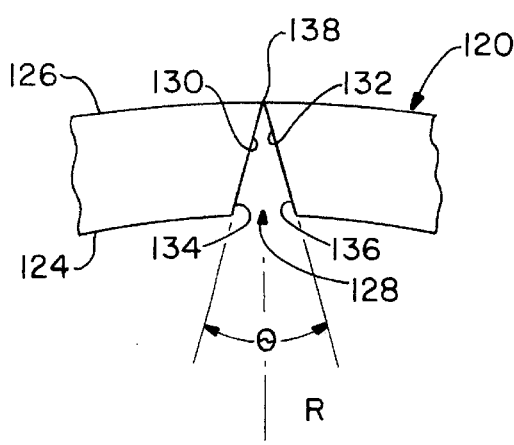
FIG. 4a is an enlarged fragmentary view of the sleeve shown in FIG. 4, showing the inverted V-shaped slit and the portions of the sleeve immediately adjacent thereto.
Figure 4B:
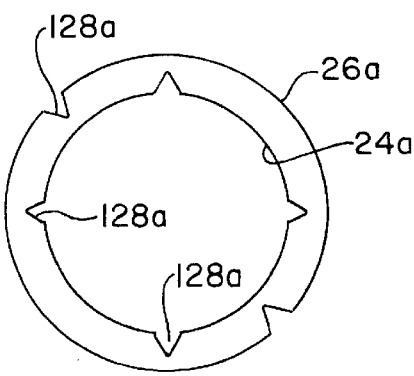
FIG. 4b is an end view of a foamed insulation sleeve according to an alternative embodiment.

The slit 128 is preferably formed fully or partially either during extrusion of sleeve 120 by a suitable die having the desired V-shaped configuration. Current extrusion methods yield a smoother wall surface which has an increased surface area over alternative slit forming methods and eliminates the need for further surface preparation. Alternatively slit 128 can also be formed by cutting using, for example, any of the cutting tools discussed in connection with the embodiments of FIGS. 1 and 2. A currently preferred method is the use of a pair of rotating knife blades oriented in an essentially horizontal relationship relative to one another. Each blade is angled from a radius R (see FIG. 4a) drawn to line of intersection 138, such that the sum of the two (2) angles equal angle θ. As a length of insulation sleeve is passed through the cutting step, the blades make successive cuts in sleeve 120 to form the desired wedge. While the formation of a single wedge or slit is all that is required, multiple V-shaped configurations 128a may be formed around the circumference of the insulation sleeve as shown in FIG. 4b i) to aid in locating a V-shaped wedge during the slit cutting process and/or ii) to act as a hinge to reduce the force required to compress the insulation sleeve during packaging and shipping. Such wedges formed through a portion of the wall thickness could be present in any number and at any position on the internal circumference 24a or external circumference 26a (or a combination thereof). Such wedges are preferably spaced equally apart (not required) and may be of equal or varying depths.

It is particularly desirable, but by no means necessary, to use a heated knife blade or knife blades, since this achieves a better surface for subsequent application of adhesive to the walls 130, 132 of slit 128. It is believed that the application smooths the surfaces of the walls and increases the contact surface area for the adhesive.

An adhesive, which may be either a pressure-sensitive adhesive or a hot melt adhesive, is applied to one or both walls (e.g., 130 and/132) of a slit (e.g., 128) in all embodiments of this invention. A pressure-sensitive adhesive preferred. Adhesives which are known in the foamed insulation adhesive art may be used. Pressure-sensitive acrylic adhesives are preferred. Examples of suitable adhesives are given in the examples. The adhesive layer formed on one or both faces (e.g., 130, 132) of a slit (e.g., 128) may be of conventional thickness (e.g., from about 0.5 to about 8.0 mils, preferably from 1.0 to about 5.0 mils, more preferably from about 2.0 to about 4.0 mils.) (One mil=0.001 inch or about 0.025 centimeters.) The adhesive layer (or layers) may be applied at the factory by means of a release tape comprising a backing and an adhesive layer with a release layer between the adhesive layer and the backing on one side only. The materials of the backing and the release layer may be conventional. The adhesive-coated release tape may be applied at the factory and the backing and the release layer peeled off at a job site when an insulation pipe construction is formed.

Figure 5:
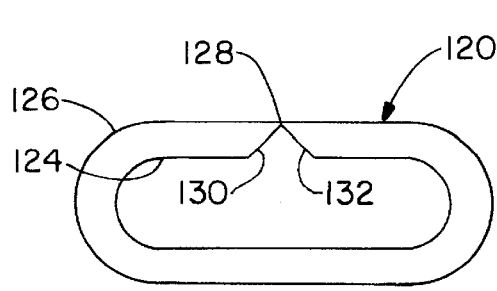
FIG. 5 is an end view of the sleeve of FIG. 4 after it has been in storage for a time.

It is assumed that the slit 128 is oriented in an "Up" C.e., in its uppermost) position during such storage or shipment or within about 30–45° either side of this position Since the elastomeric material forming sleeve 120 has permanent set, the sleeve 120 will assume the elliptical shape shown in FIG. 5 after shipment and/or prolonged storage. The angle between the two faces 130 and 132 of slit 128 will be even greater than the original angle θ which was the angle in the sleeve as formed.

Figure 6:
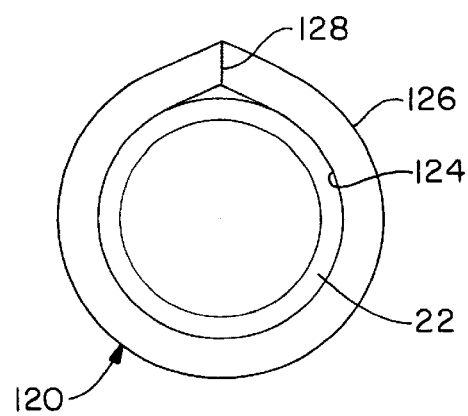
FIG. 6 is an end view of an insulation pipe construction comprising a pipe and a tubular insulation sleeve as shown in FIG. 4 installed thereon.
Figure 7:
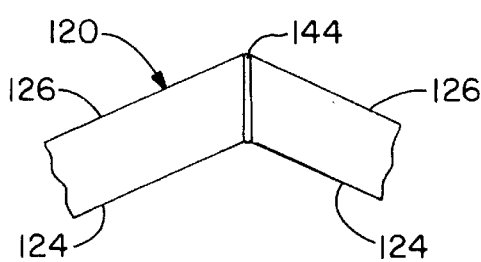
FIG. 7 is an enlarged fragmentary view of the construction shown in FIG. 6.

FIG. 6 and FIG. 7 illustrate an insulation pipe construction comprising a sleeve 120 installed around a portion of a round pipe 22. The nominal inside diameter of sleeve 120 (which may be either the inside diameter as formed or after shrinkage but while still in the original circular shape) will be slightly to somewhat larger than the outside diameter of the pipe 22 being encased and insulated. In a representative installation shown in FIGS. 6 and 7, the inside surface 124 of the insulation sleeve 120 will substantially abut the outside surface of the pipe 22 except at the slit 128, which is assumed to be directly above the pipe 22 (as shown in FIGS. 6 and 7) in the completed installation. (Flexibility of the elastomeric sleeve 120 enables installation so that the inside surface 124 substantially abuts the outside surface of the pipe; even though, distortion to the elliptical shape shown in FIG. 5 has previously occurred.) It will be noted that the inside and outside surfaces 124 and 126, respectively of sleeve 120 form a wide-angle V rather than a true circle at the slit 128 as installed, and that the opposite faces 130 and 132 of the slit 128 are now parallel and in facing engagement, and not at an acute angle as previously shown in the non-installed states of FIG. 4 or FIG. 5. As a consequence, a pressure-sensitive adhesive layer 144 (which is shown in FIG. 7) applied to one or both opposite faces 130 and 132 of slit 128 will have reduced stress (as compared to a radial cut), and the adhesive bond which retains the sleeve 120 in the configuration shown in FIGS. 6 and 7 is less likely to fail than the prior art. In order that the installer form an effective bond of faces 130 and 132, it is preferred that the installer first contact the innermost edges of the faces and then move outwardly.

Figure 8:
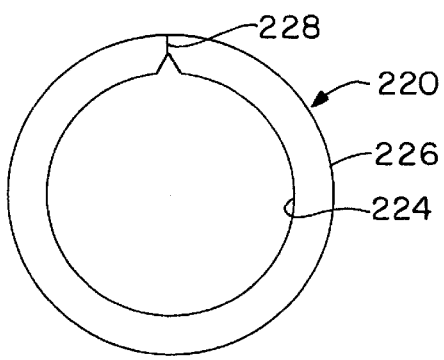
FIG. 8 is an end view of an insulation sleeve according to a second embodiment (but still according to the first aspect as described above) of this invention.
Figure 8A:
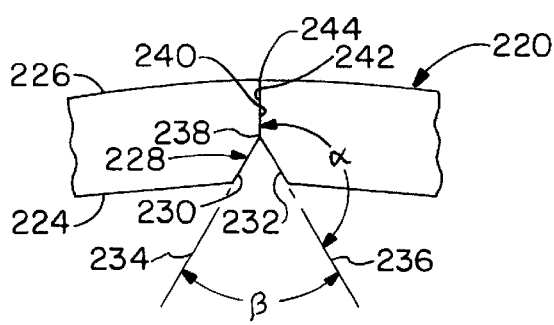
FIG. 8a is an enlarged fragmentary view of a portion of the sleeve shown in FIG. 8, namely the longitudinal slit and the portions of the sleeve immediately adjacent thereto.

A second embodiment according to a first aspect of this invention is shown in FIGS. 8 and 8a. Referring now to FIGS. 8 and 8a, an elongated tubular insulation sleeve 220 is similar to sleeve 120 in FIGS. 4–7, except that sleeve 220 has a longitudinal slit comprising an inwardly directed or inverted V portion extending from the inside surface 224 to a longitudinally extending apex line which is between surfaces 224 and 226, and a simple radial portion extending from the apex line to the outer surface 226. The inverted V portion of the wedge may extend anywhere from 5–20% of the wall of thickness of the sleeve up to just slightly less than 100% (or even 100% alleviating the need for an independent cutting step) of the sleeve's wall thickness. Intersection line 238 as shown is essentially midway between surfaces 224 and 226. The opposite walls or faces forming the inverted V portion of slit 228 include a first pair of opposite planar faces 230, 232 which are disposed at an acute angle β relative to each other, and which extend from respective lines-of-intersection 234, 236 to apex line 238. The radial portion of slit 228 includes opposite faces 240, 242, which are parallel and in facing engagement and which extend radially from apex line 238 to line 244, which is the line of intersection between slit 228 and outer surface 226.

A pressure-sensitive adhesive is applied to the opposite faces 230, 240, and 232, 242 of slit 228, and the opposite faces are compressed together, when a sleeve 220 has been installed around a pipe.

Compression of the opposite faces 230, 240, and 232, 242 of slits 228 and a pressure-sensitive adhesive applied thereto does not pose any problems, since an adhesive joint is much stronger in compression than it is in either tension or shear.

Figure 9:
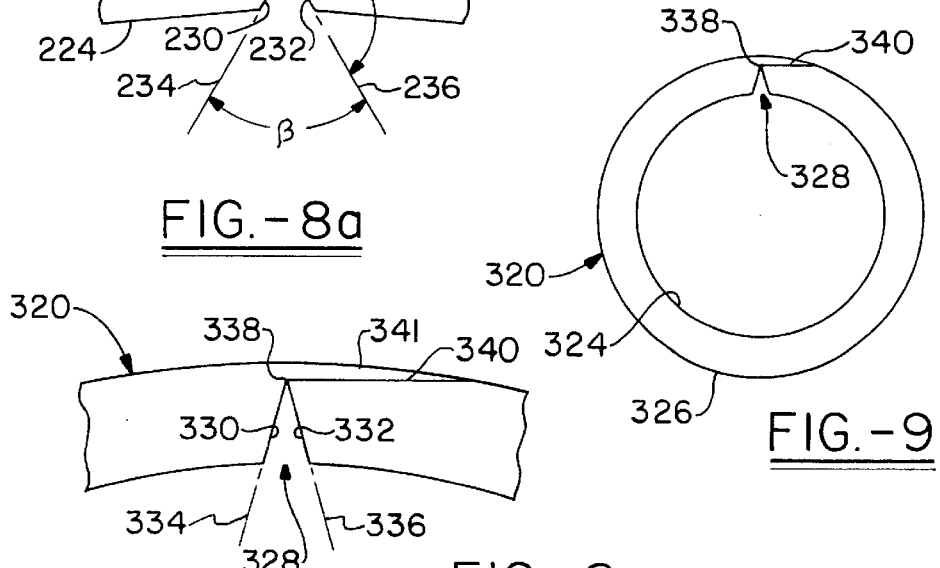
FIG. 9 is an end view of a flexible tubular elastomeric insulation sleeve according to a second embodiment (and first aspect) of the invention as formed.
Figure 9A:
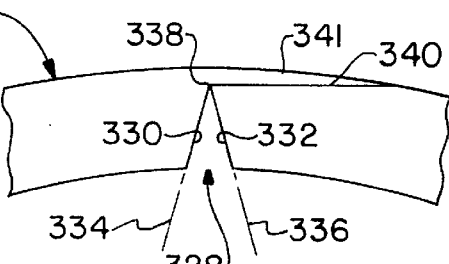
FIG. 9a is an enlarged fragmentary end view of the sleeve shown in FIG. 9, showing the longitudinal slit and portions of the sleeve immediately adjacent thereto.

A sleeve 320 according to a third embodiment (and first aspect) of this invention is shown in FIGS. 9 and 9a. Sleeve 320 is similar to sleeve 220 (FIGS. 8 and 8a) except that the inverted V portion of slit 328 (extending from inner surface 324 to apex line 338) extends over about 85% of the thickness of sleeve 320, and the remaining portion 340 of silt 328 is formed in a cut at right angles to a radius drawn to apex line 338. This provides a flap 341 and affords greater surface area than that of afforded by radial faces 240, 242 of sleeve 220 with attendant better sealing. Variations as to the size of slit 328 and flap 341 are certainly contemplated.

Figure 10:
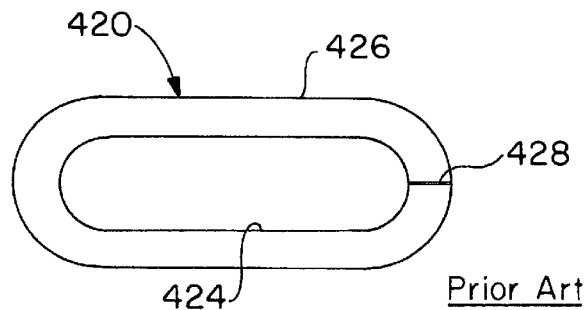
FIG. 10 is an end view of a tubular insulation sleeve of FIG. 9 after it has been slit horizontally and has been in storage for a time and has assumed an elliptical cross-sectional shape.

A further tubular insulation sleeve 420 according to a prior art embodiment will now be illustrated with respect to FIG. 10. Actually, the embodiment shown in FIG. 10 is structurally similar to the embodiment shown in FIG. 2, except that the longitudinally extending slit 428 is oriented horizontally rather than vertically.

Now suppose that a pressure-sensitive adhesive is applied to the opposite walls or faces of slit 428, as would be the case after sleeve 420 has been placed around a pipe to be insulated. Whereas the opposite faces of slit 28 in FIG. 3 tend to pull apart near the outside surface 26 of sleeve 20, the stresses on the adhesive joint 428 in FIG. 10 tending to pull the joint apart (i.e., tensile stresses) are greatest adjacent to the inside surface 424 of sleeve 420.

Figure 11:
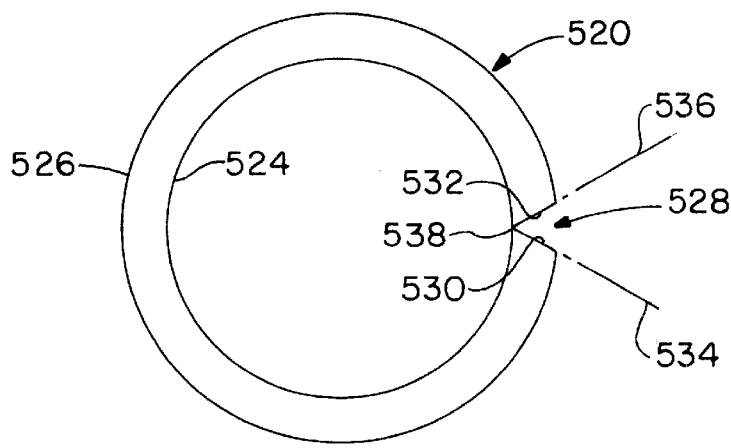
FIG. 11 is an end view of a tubular insulation sleeve according to a fourth embodiment (but still a first aspect) of this invention as formed, having a V-shaped slit which faces outwardly.
Figure 12:
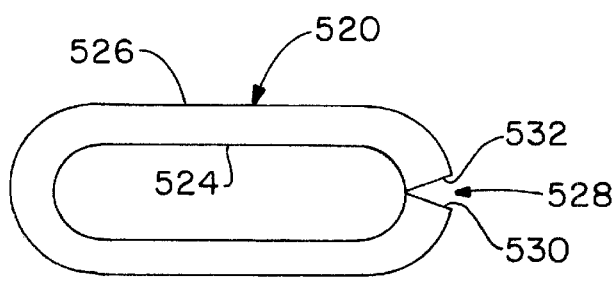
FIG. 12 is an end view of the sleeve of FIG. 11 after it has been in storage for a time and has assumed an elliptical cross-sectional shape.

An insulation sleeve 520 according to a fourth embodiment (and still according to the first aspect) of this invention as shown in FIGS. 11 and 12. This embodiment is similar to sleeve 120 shown in FIGS. 4–7 except that a normally oriented or outwardly facing longitudinal V-shaped slit 528 is provided instead of the inwardly facing or inverted V-shaped slit 128 shown in FIGS. 4–7. Slit 528 is oriented horizontally or within about 30–45 degrees either side of this position in a sleeve 520 as it is stored and/or shipped. The opposite faces 530, 532 of slit 528 intersect the outer surface 526 of sleeve 520 along respective spaced longitudinally-extending lines of intersection 534, 536.

As with previous embodiments, when sleeve 520 is compressed during storage or shipment by its own weight and/or the weight of like sleeves above it, it assumes an elliptical or oval shape as shown in FIG. 12. As a result of storage or shipment, the horizontal slit is located essentially along the major axis of the ellipse shape which results or less preferably with about 30–45% of the major axis to accommodate for shipping and handling practices.

During installation on pipe, sleeve 520, which has been distorted to an elliptical shape as shown in FIG. 12, will be returned to a nearly circular shape analogous to that shown in FIG. 6. This will bring the opposite faces 530, 532 of slit 528 together. When pressure-sensitive adhesive is applied (e.g., to these opposite faces) to close the slit 528, there will be very little stress, and, in particular, very little tensile stress, on the adhesive joint.

This invention will now be described in further detail with reference to the examples which follow. Four inch diameter insulation sleeves are illustrative only and are not seen as required to accomplish the objects of the present invention.

EXAMPLE 1

A pressure-sensitive adhesive (Ashland's Aroset® 1920 at 3 mil dried) was laminated to both of the longitudinal edges 30, 32 of a radial slit formed in a 4 inch inner diameter, 1¼ inch wall elastomeric foam pipe (FIGS. 1 and 2). The exposed adhesives were then protected from dirt and contamination by a release (silicone, quilton, etc.) coated liner (paper, polyethylene, polypropylene, etc.). The sleeve was stored with the slit in a vertical orientation and the sleeve quickly took on an oval or elliptical form. After an minimum of three days dwell, the elastomeric foam was wrapped around a 4 inch diameter metal pipe. The release liners were removed, and the two longitudinal edges containing the pressure-sensitive adhesives were firmly pressed together. Care was taken to ensure complete surface contact.

After 24 hours at room temperature, stresses and/or memory of the elastomeric foam were such that the outer portion of the bonded longitudinal seam opened approximately ¼ inch. This seam slowly continued to open until complete failure had occurred. The amount of time until total failure varied depending upon the strength of the elastomeric foam and/or of the cohesive strength of the adhesive closure system Failure was exaggerated around bends in the pipe.

This experiment was repeated using adhesives from a number of major adhesive suppliers. Self cross-Enrng acrylics such as Monsanto's RA2480, RA1753, RA2775, Ashland's Aroset® 1910, Aroset® 1845, Aroset® 1860, H&N's Polytac 445, Polytac 333, rubber based adhesives such as National Starch's 80-1068, 36-6125 and others at approximately 3 mils dried were tested and failed.

Various sizes of elastomeric foam as well as thickness of the walls were tested. The inner diameter of the elastomeric foam ranged from 1 to 4 inches, and the thickness of the walls ranged from ¼ to 1½ inch. The type of elastomeric foam was primarily vinyl nitrile.

EXAMPLE 2

In this experiment, prior to the lamination of a pressure-sensitive adhesive (Ashland's Aroset® 1920 at 2 mil dried) to the longitudinal edges of the elastomeric foam, a small inverted wedge was cut and removed in the longitudinal direction (FIG. 4). As in Experiment I, a 4 inch inner diameter and a 1¼ inch wall of elastomeric foam was used. Ashland's Aroset® 1920 adhesive then was laminated to both sides of the longitudinal edges and again protected with a release coated liner. The sleeve was stored with the slit in a vertical orientation and the sleeve quickly took on an oval or elliptical form. After three days dwell at room temperature, the elastomeric foam was positioned around a 4 in outer diameter metal pipe and the release liners removed. The two longitudinal edges with the pressure-sensitive adhesives were bonded together.

After 7 days at room temperature, there were no signs of seam separation. The elastomeric foam assembly was then placed into a 200° F. oven for 2 weeks. Again, there was no evidence of seam separation.

EXAMPLE 3

A third experiment was conducted in which a modified inverted wedge cut, shown in FIGS. 9 and 9*a* was made. Instead of a complete inverted wedge being cut through the elastomeric wall, only approximately 85% of the wall thickness was cut according to FIG. 8 & 8*a*. This allowed a small portion of the foam wall intact. Then a second cut of the elastomeric foam perpendicular to and intersecting the peak of the inverted wedge completed the modification.

Again, Ashland's Aroset®& 1920 adhesive was laminated to both longitudinal edges as well as to both of the perpendicular cuts. Similar positive results were obtained with this modified concept as were obtained in Example 1.

This invention according to a second aspect will now be described with particular reference to FIGS. 13–15.

Figure 13:
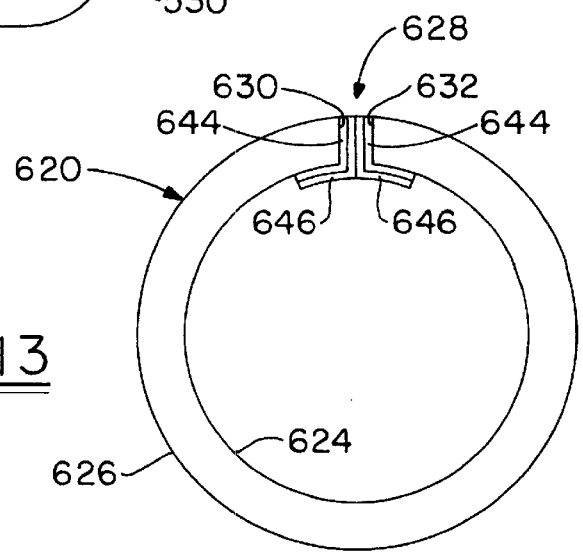
FIG. 13 is an end view of an insulation sleeve according to a second aspect of the invention, showing a tubular insulation sleeve having a longitudinal slit and a pressure-sensitive adhesive and release liner applied to the slit and adjacent portions of the inner surface of the sleeve.

FIG. 13 illustrates a tubular elastomeric foam insulation sleeve 620. Sleeve 620 has opposite cylindrical surfaces, i.e., a longitudinally extending cylindrical inside surface 624 and a longitudinally extending cylindrical outside surface 626 which is concentric with the inside surface 524. Surfaces 624 and 626 are circular in sleeve 620 as formed. Sleeve 620 also has a radial slit 628 extending longitudinally the entire length of the sleeve. Unlike the V-shaped slits shown so far (and like radial slits known in the prior art) opposite sides 630, 632 of slit 628 in the sleeve as formed are parallel and in facing engagement, and lie along a radius of sleeve 620.

A longitudinally extending adhesive tape comprising a pressure-sensitive layer 644 on a release liner backing 646 is applied to each of the faces 630, 632 of the slit and to longitudinally extending strip-like portions of the inner surface 624 of the sleeve 620 immediately adjacent to the slit 528. These strip-like portions may range in width from about ⅛ inch to about 2 inches, preferably from about ¼ inch to about 1 inch, depending somewhat on the inside diameter and the thickness of the sleeve. Materials known in the art can be used for both the pressure-sensitive layer and the release liner. This adhesive extends longitudinally the entire length of the sleeve 620. A single or split release liner may be used to cover the adhesive applied to a face (630, 632) and the adjacent adhesive on inner surface 624 adjacent to the slit.

To install sleeve 620 on a pipe, the slit 628 is opened up and the sleeve 620 is placed around a portion of the pipe. Then the release liners 646 are removed, leaving an insulated pipe construction comprising a pipe 22 (shown in fragment in FIG. 15) surrounded by a sleeve 620 (also shown in fragment in FIG. 15) and bonded thereto by means of a pressure-sensitive adhesive layer which is applied to opposite faces of the slit 628 and to longitudinally extending strip-like portions of the inside surface 624 of the sleeve 620 as well as to the outside surface of the pipe 22 immediately adjacent thereto. Formation of the bond between opposite faces should begin at the innermost edges of the faces with the installation progressing outwardly as the faces are contacted with one another.

By providing pressure-sensitive adhesive along both the slit 628 itself and along portions of the inside surface of the sleeve immediately adjacent thereto, and bonding the two opposite walls of faces of the slit to itself along the former and bonding the sleeve 620 to the pipe 22 along the latter, one achieves a long-lived adhesive bond which is much less stressed than that illustrated in FIGS. 1–3.

Figure 15:
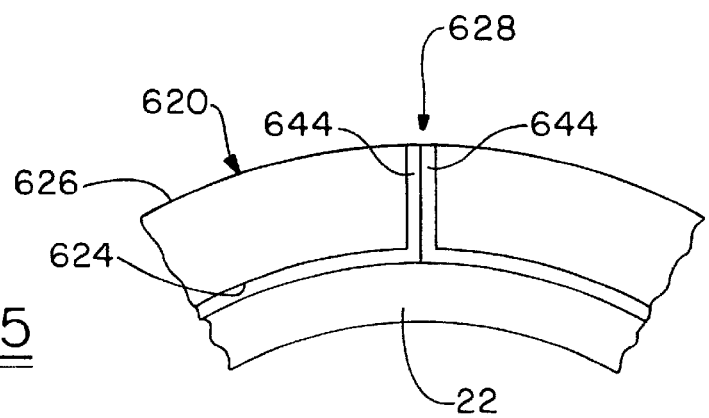
FIG. 15 is a fragmentary view of a pipe construction showing a fragmentary portion of a pipe having an insulation sleeve adhered thereto by means of an adhesive joint as shown in FIGS. 13 and 14 with the release liner removed.
Figure 16:
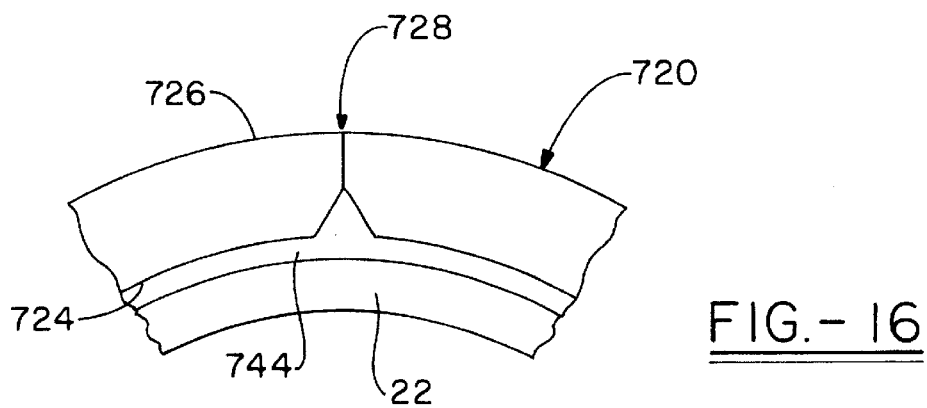
FIG. 16 is a fragmentary view of a tubular insulation sleeve an adhesive joint therefor which combines both aspects of this invention.

Finally, one can combine both aspects of the invention as shown in FIG. 16. According to this embodiment, there is provided a sleeve 720 which is structurally the same as sleeve 220 shown in FIGS. 8 and 8a, and which has a slit 728 comprising a Vshaped inner portion and a straight slit outer portion. Then a pressure-sensitive tape on a release liner backing is applied to at least a portion of the slit (say the V-shaped portion) and to the portions of the inner surface 724 of the sleeve 720 immediately adjacent thereto, in a manner similar to that illustrated in FIGS. 13–15. Then the release liners are pulled away as in FIGS. 13–15, leaving a pipe construction, shown in FIG. 16, which comprises a pipe 22, a portion of which is surrounded by a sleeve 720 and bonded thereto by an adhesive layer 744. The adhesive layer 744 also bonds opposite faces of the slit 728 to each other.

Figure 14:
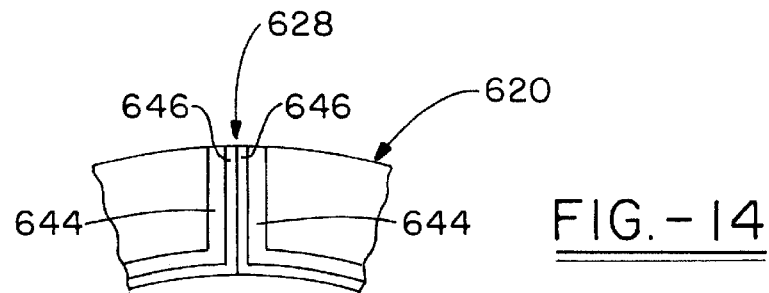
FIG. 14 is an enlarged fragmentary view of the structure shown in FIG. 13.

The embodiment shown in FIGS. 13–15 will now be illustrated with respect to the further examples which follow.

First attention is again called to Comparative Example 1 given earlier. This comparative example also serves as a comparison example for the example which follows:

EXAMPLE 4

In this experiment, Ashland's Aroset® 1920 at 2 mil dried, to both of the longitudinal edges as well as to a portion of the inside wall (approximately ½ inch) of the elastomeric foam. As in experiment I, a 4 inch in inner diameter and 1¼ inch wall of elastomeric foam was used. A release liner was laminated to the pressure-sensitive adhesive to protect from contamination (FIGS. 13 and 14). After three days dwell at room temperature, the elastomeric foam was positioned around a 4 inch in outer diameter metal pipe and the release liners were removed. The two longitudinal edges with the pressure-sensitive adhesives were bonded together simultaneously as the pressure-sensitive adhesives on the inside of the elastomeric foam was bonded to the metal pipe.

After seven days at room temperature, there were no signs of seam separation. The elastomeric foam assembly was then placed in a 200° F. oven for two weeks. Again, there was no evidence of seam separation.

This experiment was repeated using other pressure-sensitive adhesive, such as Monsanto's RA2775, National Starch's 80-1068, H&N's Polytac 445, and others. The adhesive under the foam lip next to the longitudinal slit was decreased in length to ⅛ inch, as well as increased to 2 inches. The optimum is approximately ½ inch.

While the foregoing description has set forth the preferred embodiment of the invention in particular detail, it must be understood that numerous modifications, substitutions, and changes may be undertaken without departing from the true spirit and scope of the present invention as defined by the ensuing claims.

What is claimed is:

1. A flexible tubular pipe insulation sleeve of foamed elastomeric material having permanent set and memory so as to form a measurable major and minor axis in cross section over time and wherein said major axis of said sleeve has a length greater than the length of said minor axis, said sleeve as formed having a body which is bounded by a cylindrical inner surface adapted to surround a pipe and a cylindrical outer surface which is concentric with said inner surface, said sleeve as formed further including a longitudinal slit extending from said inner surface to said outer surface, at least a portion of said slit as formed being of a wedge shape in cross section with an apex end and an open end, said apex end of said wedge shape nearer to said outer surface of said sleeve than said open end and said slit further comprising a pair of opposite walls, said slit is oriented within a range of about 45° on either side of said minor axis of said sleeve which has formed over time.

2. An insulation sleeve according to claim 1 in which said slit is oriented within a range of about 30° on either side of said minor axis of said sleeve which has formed over time.

3. An insulation sleeve according to claim 1 wherein said apex end of said wedge is at said outer surface of said sleeve.

4. An insulation sleeve according to claim 1 in which said apex end is between said inner surface and said outer surface.

5. An insulation sleeve according to claim 1 wherein said apex end is essentially midway between said inner surface and said outer surface of said sleeve.

6. An insulation sleeve according to claim 1 in which said open end of said wedge shape forms an angle of about 5° to about 60°.

7. An insulation sleeve according to claim 6 in which said angle is from about 7° to about 30°.

8. An insulation sleeve according to claim 1, and further comprising a pressure-sensitive adhesive applied to at least a portion of at least one of said walls of said slit.

9. An adhesive construction according to claim 8 in which said pressure sensitive adhesive is an acrylic adhesive.

10. An insulation sleeve according to claim 1 in which a first portion of said longitudinal slit as formed is of a wedge shape in cross section with an apex end and an open end and a second portion of said slit is transverse to the longitudinal axis of said sleeve.

11. An insulation sleeve according to claim 1 wherein the length of said minor axis of said sleeve is at least 2 inches.

12. An adhesive construction comprising:
    (a) a flexible tubular pipe insulation sleeve of foamed elastomeric material, said sleeve as formed having a body which is bounded by a cylindrical inner surface adapted to surround a pipe and a cylindrical outer surface concentric with said inner surface, said sleeve as formed further including a longitudinal slit extending from said inner surface to said outer surface and having opposite first and second walls; and
    (b) a pressure-sensitive adhesive comprising a first portion applied to at least one of said walls of said slit, and a second portion applied to a portion of said inner surface of said sleeve adjacent to and on at least one side of said slit, said first portion being adapted to adhere opposite walls of said slit together and said second portion of adhesive being adapted to adhere the inner surface of said insulation sleeve to a pipe.

13. An adhesive construction according to claim 12 wherein said pressure-sensitive adhesive comprises a second portion applied to portions of said inner surface of said sleeve adjacent to and on both sides of said slit, said second portion of adhesive being in the form of a pair of longitudinally extending strips which are on opposite sides of said slit.

14. An adhesive construction according to claim 12 wherein sleeve as formed has a body which is bounded by a cylindrical inner surface adapted to surround a pipe and a cylindrical outer surface which is concentric with said inner surface, said sleeve as formed further including a longitudinal slit extending essentially radially from said inner surface to said outer surface, at least a portion of said slit as formed being of V configuration and comprising a pair of intersecting opposite walls which intersect one of said cylindrical surface along respective spaced parallel and longitudinally extending first and second intersection lines and which intersect each other at an acute angle along the longitudinally extending apex line which is spaced from and parallel to said intersection lines and within the body of said sleeve.

15. An adhesive construction according to claim 12 in which said pressure sensitive is an acrylic adhesive.

16. A flexible tubular pipe insulation sleeve of foamed elastomeric material having permanent set and memory so as to form a measurable major and minor axis in cross section over time and wherein said major axis of said sleeve has a length greater than the length of said minor axis, said sleeve as formed having a body which is bounded by a cylindrical inner surface adapted to surround a pipe and a cylindrical outer surface which is concentric with said inner surface, said sleeve as formed further including a longitudinal slit extending from said inner surface to said outer surface, at least a portion of said slit as formed being of a wedge shape in cross section with an apex end and an open end said apex end of said wedge shape nearer to said inner surface of said sleeve than said open end and said slit further comprising a pair of opposite walls, said slit is oriented within a range of about 45° on either side of said major axis of said sleeve which has formed over time.

17. An insulation sleeve according to claim 16 wherein said apex end of said wedge is at said inner surface of said sleeve.

18. An insulation sleeve according to claim 16 wherein said apex end of said wedge is between said inner surface and said outer surface.

19. An insulation sleeve according to claim 16 in which said open end of said wedge shape forms an angle of about 5° to about 60°.

20. An insulation sleeve according to claim 16 in which said slit is oriented within a range of about 45° on either side of said minor axis of said sleeve which has formed over timne.

21. An insulation sleeve according to claim 16 in which said slit is oriented within a range of about 30° on either side of said minor axis of said sleeve which has formed over time.

22. An insulation sleeve according to claim 16 in which a first portion of said longitudinal slit as formed is of a wedge shape in cross section with an apex end and an open end and a second portion of said slit is transverse to the longitudinal axis of said sleeve.

23. An insulation sleeve according to claim 16 wherein the length of said minor axis of said sleeve is at least 2 inches.

24. An insulation sleeve according to claim 16 further comprising a pressure sensitive adhesive applied to at least a portion of at least one of said walls of said slit.

* * * * *